Dec. 19, 1939.     D. G. K. MOSS     2,183,939
ROLLING VALVE FOR AIR-CONTROLLED INSTRUMENTS
Filed June 27, 1938
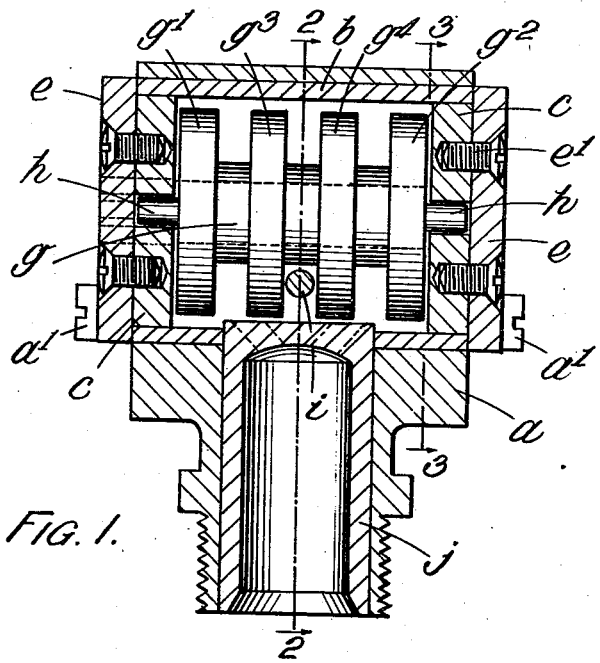
FIG. 1.
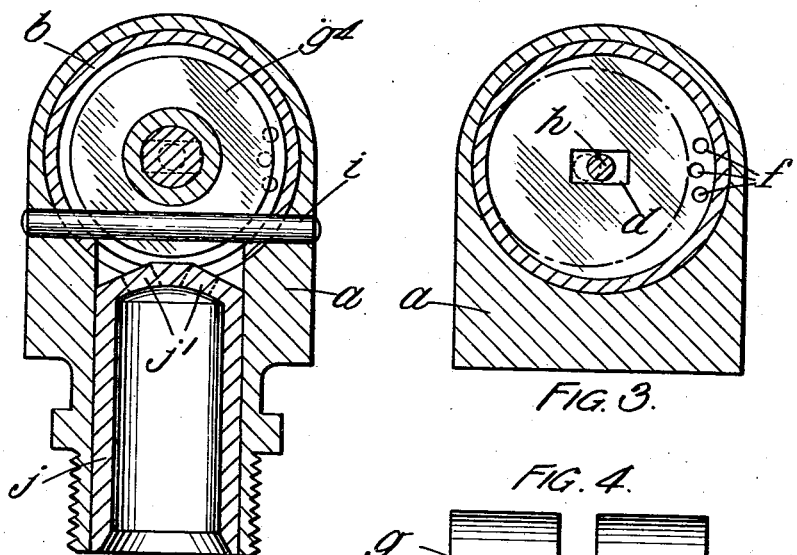
FIG. 2.          FIG. 3.
FIG. 4.
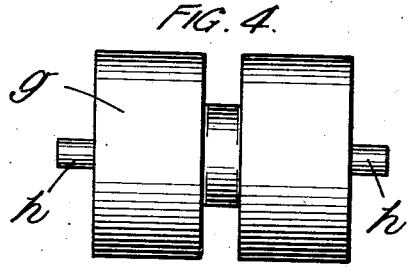
Douglas George King Moss
INVENTOR
By Otto Munk
his ATT'Y.

Patented Dec. 19, 1939

2,183,939

UNITED STATES PATENT OFFICE 2,183,939

ROLLING VALVE FOR AIR-CONTROLLED INSTRUMENTS

Douglas George King Moss, Sanderstead, England, assignor to Mechanism Limited, Croydon, England, a limited corporation of Great Britain Application June 27, 1938, Serial No. 216,073
In Great Britain July 22, 1937

10 Claims. (Cl. 137—139)

This invention relates to improvements in rolling valves for air-controlled instruments, such as gyroscopic navigational instruments.

A rolling valve, for controlling the erection of one or both gimbals of a gyroscopic instrument by opening and closing oppositely directed air exit orifices, is known, such valve being, for example, described in Patent No. 2,036,229.

The present invention is particularly concerned with the form of the rolling element which is supported by pins located in arcuate or straight line slots in the walls of the valve chamber. When the instrument is operating in dirty air, or should grease have entered the valve chamber, there may be a tendency for the end of the rolling element to stick to the wall of the chamber which tends to make the valve somewhat sluggish in operation. Also, when the valve chamber is in an angular position, there may be a tendency for the rolling element to skew round to a slight extent—a tendency which might affect the perfect working of the valve.

The principal object of the present invention is to construct a valve free from the slight disadvantages above recited which will operate satisfactorily over long periods even under disadvantageous conditions.

To this end, according to the invention, the rolling element is provided with a recess or flange or flanges adapted to engage an element or elements extending transversely of the chamber to prevent skewing of the rolling element. The rolling element may be formed with at least one portion of reduced diameter adapted to embrace a guide pin disposed transversely in the valve chamber.

According to a further feature of the invention, the rolling element is formed with three reduced portions to provide two radial flanges which take about the guide pin.

Hitherto, it has been usual to allow the air to enter the valve chamber through a single orifice directing the air radially onto the rolling element. Now, according to a still further feature of the invention, air is led into the valve chamber through a plurality of orifices so that the air streams onto the inner faces of the ends of the flanged rolling element whereby any impurities such as dirt or grease carried along by the air are deposited on those surfaces where they will not impede the free movement of the rolling element.

The flanges which are conveniently of less diameter than the end faces of the rolling element are burnished as is also the guide pin in order to reduce friction.

In order that the invention may be clearly understood and readily carried into effect, the same is hereinafter more fully described with reference to the accompanying drawing which is given by way of example only and not of limitation.

In the drawing—

Figure 1 is a side sectional elevation,
Figure 2 is a section on the line 2—2,
Figure 3 is a section on the line 3—3, and
Figure 4 is a side view of another form of rolling element.

Referring now to Figures 1 to 3 of the said drawing, the valve comprises a main member $a$ carrying an annular valve chamber $b$ having end walls $c$ in which are provided slots $d$ conveniently of rectangular form. The walls $c$ are closed by plates $e$ secured thereto as by screws $e^1$, the plates $e$ being secured to the main member $a$ by screws $a^1$, the heads of which take over the edges of the plates $e$. A set of three orifices $f$ is provided in each of the two oppositely disposed end walls of the valve chamber $b$, the orifices $f$ extending through both the inner wall $c$ and the outer cover plate $e$. Of the three orifices in each group, the innermost orifice is located nearer the centre.

The rolling element $g$ is formed with three portions of reduced diameter to provide end portions $g^1$, $g^2$ and two radial flanges $g^3$, $g^4$. The rolling element $g$ is supported by pins $h$ located in the slots $d$.

A pin $i$ situated between the flanges $g^3$, $g^4$, extends across the valve chamber. This pin, as also the faces of the flanges contacting therewith, is burnished in order to reduce friction. The pin $i$ is just clear of the inner surfaces of the flanges and also clear of the core of the rolling element so as not to impede the free rolling movement thereof. Were, however, the rolling element to attempt to skew around, this is prevented by the flanges $g^3$, $g^4$ engaging said pin.

Controlling air is led in through the member $j$ situated in the axial bore in the main member $a$. In the closed end of the member $j$ are provided inclined apertures $j^1$ so arranged as to direct the air onto the inner faces of the end portions $g^1$, $g^2$ of the rolling element. There may be four or more of the orifices $j^1$. Due to the direction of the air onto the inner faces of the end portions of the rolling element, any dirt or grease which may be carried along will be deposited on those faces where it cannot impede the movement of the rolling element. Also, as the air is equally directed onto both end portions and also equally to either side of its core, there is no tendency to blow the rolling element to one or other side of the valve chamber, nor to tend to hold it to one side after displacement. The angularity of the orifices $j^1$ is desirably such that the air streams miss the flanges and impinge only on the inner faces of the end portions.

In a modification, as illustrated in Figure 4, the rolling element is provided only with a single portion of reduced diameter designed to take about the pin $i$ in the valve chamber.

I claim:

1. An air valve for navigation instruments comprising a chamber, an air inlet thereto, air exit orifices in opposite walls of said chamber, a guiding member in said chamber, and a rolling element in said chamber, pins supporting said rolling element in slots provided in the walls of said chamber, said guiding member controlling the movement of said rolling element within the chamber walls.

2. An air valve for navigation instruments comprising a chamber, an air inlet thereto, air exit orifices located in oppositely disposed end walls of said chamber, a pin extending transversely through said chamber, and a rolling element in said chamber adapted to embrace said pin, supporting pins for said rolling element, said supporting pins being supported in slots in the end walls of the chamber.

3. An air valve for navigation instruments comprising a chamber, an air inlet thereto, air exit orifices disposed in opposite end walls of said chamber, a pin extending transversely through said chamber, and a rolling element in said chamber provided with a portion of reduced diameter in which is located said pin and supporting pins for said rolling element, said supporting pins being supported in slots in the end walls of the chamber.

4. An air valve for navigation instruments comprising a chamber, an air inlet thereto, air exit orifices disposed in opposite end walls of said chamber, a pin extending transversely through said chamber, and a rolling element in said chamber provided with flanges between which is located said pin, supporting pins for said rolling element, said supporting pins being supported in slots in the end walls of the chamber.

5. An air valve for navigation instruments comprising a chamber, an air inlet thereto, air exit orifices disposed in opposite end walls of said chamber, a pin extending transversely through said chamber, and a rolling element in said chamber provided with three portions of reduced diameter in one of which is located said pin and supporting pins for said rolling element, said supporting pins being supported in slots in the end walls of the chamber.

6. An air valve as claimed in claim 5, in which the transverse pin is located in the middle portion of reduced diameter and the incoming air is directed into the two other portions of reduced diameter.

7. A valve for air-controlled instruments comprising a valve chamber, air exit orifices disposed in opposite end walls of said chamber, a rolling element in said chamber, pins for supporting said rolling element in slots provided in the end walls of the chamber, a transverse element in the valve chamber, said rolling element being provided with a portion of reduced diameter adapted to embrace the said transverse element.

8. An air valve for navigation instruments comprising a chamber, air exit orifices disposed in opposite end walls of said chamber, a pin extending transversely through said chamber, a rolling element in said chamber provided with flanges between which is located said pin and supporting pins for said rolling element, said supporting pins being suspended in slots in the end walls of the chamber, and air inlet orifices to said chamber directing the air between the flanges and the end walls of the rolling element.

9. An air valve for navigation instruments comprising a valve chamber, a rolling element adapted to open and close air exit orifices provided in the said chamber, a transverse element between the chamber walls, guiding means provided on said rolling element and cooperating with said transverse element, whereby skewing of the rolling element is prevented.

10. An air valve for navigation instruments comprising a chamber, an air inlet thereto, air exit orifices disposed in the opposite end walls of said chamber, a transverse element in said chamber, and a rolling element in said chamber adapted on movement to open and close said air exit orifices, said rolling element having a portion embracing said transverse element, and supporting pins for said rolling element, said supporting pins being supported in slots in the end walls of the chamber.

DOUGLAS GEORGE KING MOSS.